US010478772B2

(12) United States Patent
Philbrook et al.

(10) Patent No.: US 10,478,772 B2
(45) Date of Patent: Nov. 19, 2019

(54) PROCESS TO DECOUPLE REGENERATION GAS COMPRESSOR FROM REGENERATION GAS TREATING

(71) Applicants: Sean T. Philbrook, Houston, TX (US); Kevin N. Stanley, Spring, TX (US)

(72) Inventors: Sean T. Philbrook, Houston, TX (US); Kevin N. Stanley, Spring, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 204 days.

(21) Appl. No.: 15/614,995

(22) Filed: Jun. 6, 2017

(65) Prior Publication Data

US 2018/0056236 A1 Mar. 1, 2018

Related U.S. Application Data

(60) Provisional application No. 62/381,880, filed on Aug. 31, 2016.

(51) Int. Cl.

| | |
|---|---|
| *B01D 53/02* | (2006.01) |
| *B01D 53/44* | (2006.01) |
| *B01D 53/04* | (2006.01) |
| *C09K 5/04* | (2006.01) |
| *B01D 3/14* | (2006.01) |
| *F02C 9/50* | (2006.01) |
| *B01D 53/00* | (2006.01) |

(Continued)

(52) U.S. Cl.
CPC ............... *B01D 53/44* (2013.01); *B01D 3/14* (2013.01); *B01D 53/002* (2013.01); *B01D 53/0438* (2013.01); *B01D 53/265* (2013.01); *C09K 5/041* (2013.01); *F02C 9/50* (2013.01); *B01D 2257/602* (2013.01); *B01D 2257/702* (2013.01); *B01D 2257/80* (2013.01); *B01J 20/3408* (2013.01); *C09K 2205/12* (2013.01); *F01P 2003/001* (2013.01); *F02C 7/143* (2013.01)

(58) Field of Classification Search
CPC ........ B01D 2257/602; B01D 2257/702; B01D 2257/80; B01D 53/002; B01D 53/0438; B01D 53/265; B01D 53/44; B01J 20/3408; C09K 2205/12; C09K 5/041; F01P 2003/001; F02C 7/143; F02C 9/50
See application file for complete search history.

(56) References Cited

U.S. PATENT DOCUMENTS

| | | | |
|---|---|---|---|
| 3,527,024 A | 9/1970 | McMinn et al. ............ | 55/62 |
| 3,718,581 A * | 2/1973 | Kleinpeter ............ | C10G 5/02 208/340 |

(Continued)

*Primary Examiner* — Christopher P Jones
(74) *Attorney, Agent, or Firm* — ExxonMobil Upstream Research Company—Law Department

(57) ABSTRACT

A method for continuously treating a regeneration gas stream used to regenerate a molecular sieve adsorption vessel is disclosed. The regeneration gas stream is cooled in a cooler to a temperature suitable to condense liquids therein. A separator removes liquids condensed in the regeneration gas stream. The regeneration gas stream is compressed in a compressor. The regeneration gas stream is flowed through the cooler, the separator, and the compressor when the compressor is operational. The regeneration gas stream is flowed through the second cooler and the second separator but not the compressor when the compressor is not operational, thereby enabling continuous treatment of the regeneration gas stream.

11 Claims, 5 Drawing Sheets

(51) Int. Cl.
*B01D 53/26* (2006.01)
*B01J 20/34* (2006.01)
*F01P 3/00* (2006.01)
*F02C 7/143* (2006.01)

(56) References Cited

U.S. PATENT DOCUMENTS

| | | | |
|---|---|---|---|
| 4,487,614 A | 12/1984 | Yon | 55/33 |
| 4,726,818 A | 2/1988 | Yeung et al. | 55/33 |
| 10,286,357 B2 * | 5/2019 | Van Minnebruggen | B01D 53/261 |
| 2015/0096309 A1 | 4/2015 | Mathur | 210/773 |

* cited by examiner

PROCESS TO DECOUPLE REGENERATION GAS COMPRESSOR FROM REGENERATION GAS TREATING

CROSS REFERENCE TO RELATED APPLICATIONS

This application claims the priority benefit of U.S. Patent Application 62/381,880 filed Aug. 31, 2016 entitled PROCESS TO DECOUPLE REGENERATION GAS COMPRESSOR FROM REGENERATION GAS TREATING, the entirety of which is incorporated by reference herein.

BACKGROUND

Field of Disclosure

The disclosure relates generally to hydrocarbon processing, and more particularly, to regeneration of molecular sieve systems.

Description of Related Art

This section is intended to introduce various aspects of the art, which may be associated with the present disclosure. This discussion is intended to provide a framework to facilitate a better understanding of particular aspects of the present disclosure. Accordingly, it should be understood that this section should be read in this light, and not necessarily as an admission of prior art.

Molecular sieve systems are commonly used to treat natural gas streams by removing contaminants such as water, mercury, mercaptans or heavy hydrocarbons. Molecular sieves accumulate contaminants over time via adsorption and must be regenerated periodically in continuous service. Regeneration is accomplished by flowing heated gas, typically treated product gas, over the molecular sieve bed to remove the contaminants adsorbed during the regeneration gas bed's adsorption cycle. Molecular sieve regeneration gas systems may contain processing equipment to remove these contaminants from the regeneration gas stream. Additionally, regeneration gas may be recycled upstream of the molecular sieve unit using a recycle compressor to recover the regeneration gas stream.

FIG. 1 shows a regeneration gas system 100 used to support operation of a molecular sieve adsorbent vessel(s) 102 as is known in the art. A feed gas stream 104 enters the molecular sieve adsorbent vessel(s) 102 and contaminants in the feed gas stream 104 are removed thereby. A product gas stream 106 exits molecular sieve adsorbent vessel(s) 102. Contaminants accumulated in the molecular sieve adsorbent vessel(s) 102 are removed by flushing the molecular sieve with a regeneration gas stream 108, which in this configuration comprises part of the product gas stream 106. The regeneration gas stream 108 is first heated by a regeneration gas heater 109 and is directed to the molecular sieve adsorbent vessel to remove accumulated contaminants. Isolation valves 110, 112 are opened so the regeneration gas stream 108 may flow through the regeneration gas system 100. System 100 includes a compressor 114 that compresses the regeneration gas stream so that it may be recycled to the feed gas stream 104 upstream of the molecular sieve adsorbent vessel(s) 102. A cooler 118 and liquids separation drum 122 are sized to remove the heat from the regeneration gas stream, condense contaminants (such as water) or product liquids (such as heavy hydrocarbons) and separate such contaminants or liquids 124 from the regeneration gas stream 108. Cooler 118 may also serve to eliminate the heat of compression when compressor 114 is being operated in the recycle mode. The regeneration gas stream 108 may then be compressed in compressor 114. Gas processing components, such as a process vessel 126 and filters 130, may be included to further treat the regeneration gas stream 108, such as for the removal of mercury. Such gas processing components typically are located between the isolation valves 110, 112 and downstream of cooler 118 and liquids separation drum 122. An anti-surge valve 134 may re-direct the regeneration gas stream 108 between the isolation valves 110, 112 to protect the compressor 114 from surges due to low flow conditions. If for some reason the compressor is not operational, the regeneration gas stream may be directed through an opened bypass valve 138 to be flared or treated in an alternate vapor recovery system (not shown). If the compressor is not operational and only a single cooler and liquids separation drum is provided between isolation valves 110, 112 (i.e., within the regeneration gas system 100), then processing the regeneration gas stream to remove contaminants or recover liquids prior to flaring or disposal may not be possible. If the regeneration gas stream is flared, contaminants may be unnecessarily released to the environment and/or revenue may be lost. If the regeneration gas stream is recycled back to the molecular sieve adsorbent vessel via the vapor recovery system, contaminants may accumulate and become concentrated in the main natural gas stream. What is needed is a means to remove contaminants from a regeneration gas stream that is usable when a related compressor is not operating.

SUMMARY

The present disclosure provides a method for continuously treating a regeneration gas stream used to regenerate a molecular sieve adsorption vessel. The regeneration gas stream is cooled in a cooler to a temperature suitable to condense liquids in the regeneration gas stream. A separator removes liquids condensed in the regeneration gas stream. The regeneration gas stream is compressed in a compressor. The regeneration gas is flowed through the cooler, the separator, and a compressor when the compressor is operational. The regeneration gas is flowed through the cooler and the separator but not the compressor when the compressor is not operational. Continuous treatment of the regeneration gas stream is thereby enabled.

The present disclosure also provides a contaminant removal system for continuously treating a regeneration gas stream of a molecular sieve adsorbent vessel. A cooler is configured to cool the regeneration gas stream. A separator is configured to remove liquids in the regeneration gas stream condensed by the cooler. First and second isolation valves are located before and after the compressor and are configured to selectively permit the regeneration gas stream to pass therethrough. The cooler and the separator are not located between the first and second isolation valves. A controller controls the isolation valves to open when the compressor is operational and to close when the compressor is not operational. The regeneration gas stream flows through the cooler and the separator regardless of whether the isolation valves are open or closed, thereby enabling continuous treatment of the regeneration gas stream.

The present disclosure also provides a method for continuously treating a regeneration gas stream used to regenerate a molecular sieve adsorption vessel. The regeneration gas stream is cooled in a first cooler to a temperature suitable to condense liquids in the regeneration gas stream. A first separator removes the liquids condensed in the regeneration gas stream. The regeneration gas stream is cooled in a second cooler to perform at least one of (a) removing any remaining heat in the regeneration gas stream to bring the regeneration gas stream down to a desired process temperature, and (b) to remove heat of compression added to the regeneration gas stream by a compressor when the compressor is operating in a recycle mode, wherein the second cooler is sized to accommodate the larger of a heat duty required for (a) or a heat duty required for (b). A second separator removes liquids condensed in the second cooler. The regeneration gas stream is compressed in a compressor. The second cooler, the second separator, and the compressor are arranged between first and second isolation valves. The first and second isolation valves are opened when the compressor is operational, to permit the regeneration gas stream to flow to the second cooler, the second separator, and the compressor. The first and second isolation valves are closed when the compressor is not operational, to prevent the regeneration gas stream to flow to the second cooler, the second separator, and the compressor. A bypass valve is opened to permit the regeneration gas stream to be flared or flowed to a vapor recovery system when the first and second isolation valves are closed, thereby enabling continuous treatment of the regeneration gas stream.

The foregoing has broadly outlined the features of the present disclosure so that the detailed description that follows may be better understood. Additional features will also be described herein.

BRIEF DESCRIPTION OF THE DRAWINGS

These and other features, aspects and advantages of the disclosure will become apparent from the following description, appending claims and the accompanying drawings, which are briefly described below.

Figure 1:
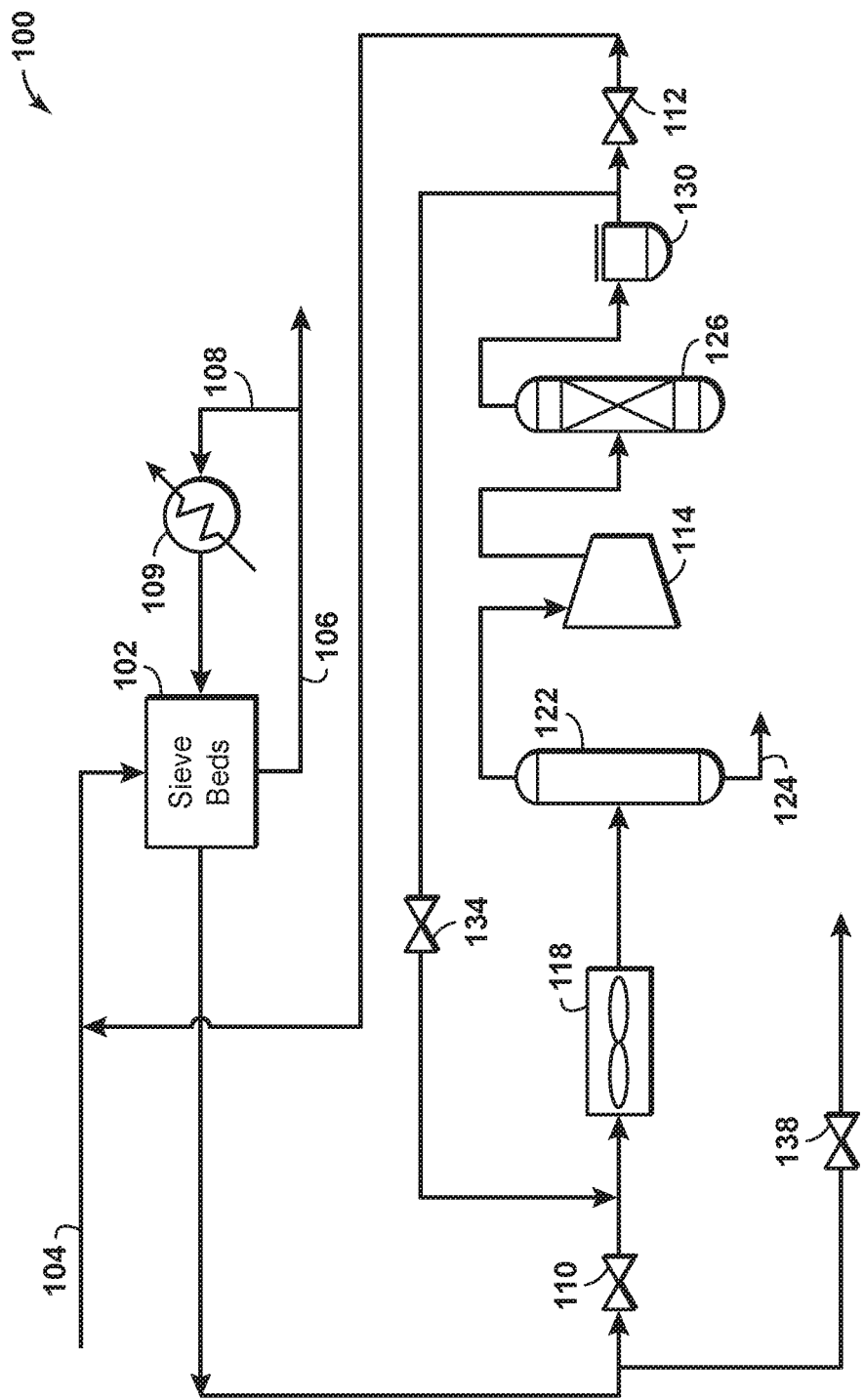
FIG. 1 is a schematic diagram of a prior art regeneration gas treatment system.

It should be noted that the figures are merely examples and no limitations on the scope of the present disclosure are intended thereby.

DETAILED DESCRIPTION

To promote an understanding of the principles of the disclosure, reference will now be made to the features illustrated in the drawings and specific language will be used to describe the same. It will nevertheless be understood that no limitation of the scope of the disclosure is thereby intended. Any alterations and further modifications, and any further applications of the principles of the disclosure as described herein are contemplated as would normally occur to one skilled in the art to which the disclosure relates. For the sake of clarity, some features not relevant to the present disclosure may not be shown in the drawings.

At the outset, for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

As one of ordinary skill would appreciate, different persons may refer to the same feature or component by different names. This document does not intend to distinguish between components or features that differ in name only. The figures are not necessarily to scale, but are drafted for purposes of convenience and clarity in illustrating various aspects of the disclosure.

Certain features and components herein may be shown exaggerated in scale or in schematic form and some details of conventional elements may not be shown in the interest of clarity and conciseness. When referring to the figures described herein, the same reference numerals may be referenced in multiple figures for the sake of simplicity. In the following description and in the claims, the terms "including" and "comprising" are used in an open-ended fashion, and thus, should be interpreted to mean "including, but not limited to."

The articles "the," "a" and "an" are not necessarily limited to mean only one, but rather are inclusive and open ended so as to include, optionally, multiple such elements.

As used herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numeral ranges provided. Accordingly, these terms should be interpreted as indicating that insubstantial or inconsequential modifications or alterations of the subject matter described and are considered to be within the scope of the disclosure.

As use herein, "heavy hydrocarbons" means hydrocarbons with a molecular structure containing three or more carbon atoms.

Aspects described herein allow a regeneration process used to regenerate a spent molecular sieve adsorbent material, including contaminant removal from the regeneration gas or recovery of liquids, to continue when the associated regeneration gas compressor is out of operation. The disclosed aspects include installing additional cooling and separation equipment to cool the regeneration gas and separate condensed liquids while the regeneration gas compressor is not operable or starting-up in full recycle. The disclosed aspects enable complete processing of the regeneration gas stream, thereby preventing undesirable emission of contaminants and allowing recovery of liquid products while the regeneration gas compressor is out of service.

Figure 2:
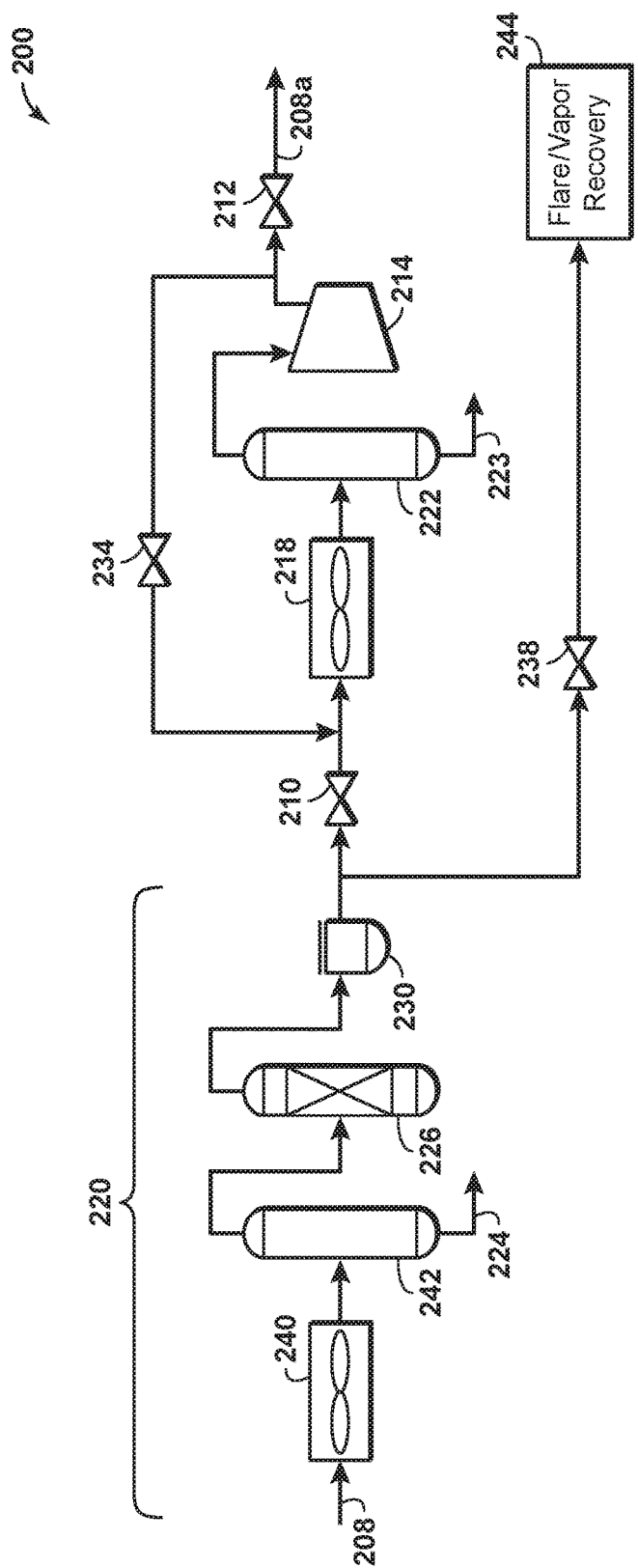
FIG. 2 is a schematic diagram of a regeneration gas treatment system according to the disclosed aspects.

FIG. 2 depicts a regeneration gas system 200 used to regenerate a molecular sieve adsorbent vessel according to aspects of the disclosure. The molecular sieve adsorbent vessel, and the connections between the molecular sieve adsorbent vessel and the regeneration gas system 200, may be as shown in FIG. 1. For the purposes of clarity and brevity the molecular sieve adsorbent vessel 102 will not be shown in FIGS. 2-4; it is understood, however, that such vessel 102 and associated gas streams (e.g., 104, 106) are incorporated by reference into the remaining Figures. It is further understood that the particular molecular sieve adsorbent vessel and its configuration in FIG. 1 is a non-limiting example of a molecular sieve adsorbent vessel that may be used with the regeneration gas systems disclosed herein, and that any other suitable vessel and/or configuration may be used with the aspects of the present disclosure. A regeneration gas stream 208, which includes contaminants removed from the molecular sieve adsorbent vessel, is first processed by gas processing components 220 which are disposed outside of isolation valves 210, 212. The gas processing components 220 may include a first cooler 240, a first liquids separation drum 242, one or more process vessels 226, and one or more filters 230. First cooler 240 is sized to cool the regeneration gas stream 208 to a temperature suitable for use in the process vessel 226, or to a temperature suitable for liquids knockout and recovery using, for example, the first liquids separation drum 242. First cooler 240 may be an air cooler, a water cooler, or a refrigerant-based chiller such as a propane-based chiller. Additional coolers may be used as needed. The first liquids separation drum 242 may be used to remove condensed liquids (via first liquids stream 224) from the regeneration gas stream at the process conditions. Process vessel 226 may be used for further treatment of the regeneration gas stream, such as for the removal of contaminants. Filters 230 may be required depending on the nature of the process vessel 226. An additional filter/coalescer element may be installed if required by the process vessel 226.

Additional equipment is disposed between the isolation valves 210, 212. This additional equipment may include a second cooler 218, a second liquids separation drum 222, and a compressor. Second cooler 218 may be sized to reduce the temperature of the regeneration gas stream during normal operation to the required operating temperature, or to remove heat generated during full recycle operation of compressor 214, whichever duty is largest. Second liquids separation drum 222 may be used to remove condensed liquids (via second liquids stream 223) from the regeneration gas stream at the process conditions. Compressor 214 may be used during normal regeneration processes to recycle the processed regeneration gas stream 208a upstream of the molecular sieve adsorbent vessel (not shown).

When the compressor is operational, i.e., when the compressor is operating normally and it is desired for the compressor to do so, the isolation valves 210, 212 are open. Regeneration gas stream 208 flows through the gas processing components 220, second cooler 218, second liquids separation drum 222, and compressor 214, and is thereby cleaned and compressed sufficiently enough to be recycled upstream of the molecular sieve adsorbent vessel. When compressor 214 is not operational, i.e., when the compressor is not able to compress the regeneration gas or when it is not desired for the compressor to do so, isolation valves 210, 212 are closed; regeneration gas stream 208 flows through the gas processing components 220 (which in FIG. 2 include first cooler 240, first liquids separation drum 242, process vessel 226, and filter 230) and through a regeneration gas control valve 238 to a flare system or to an alternate vapor recovery system 244. This allows the gas processing components 220 of the regeneration gas system 200 to operate while compressor 214 is not in operation. Additionally, compressor 214 may be operated in a full recycle mode using an anti-surge valve 234, which connects part of the output of the compressor to an input of the second cooler.

Using the anti-surge valve in this manner, the compressor may be re-started without interrupting flow of the regeneration gas stream 208. Such an operation permits continued process treatment of regeneration gas and/or liquids recovery from the regeneration gas stream, in contrast to existing technology that would send contaminants and/or hydrocarbon liquids to flare, creating undesirable emissions.

Figure 3:
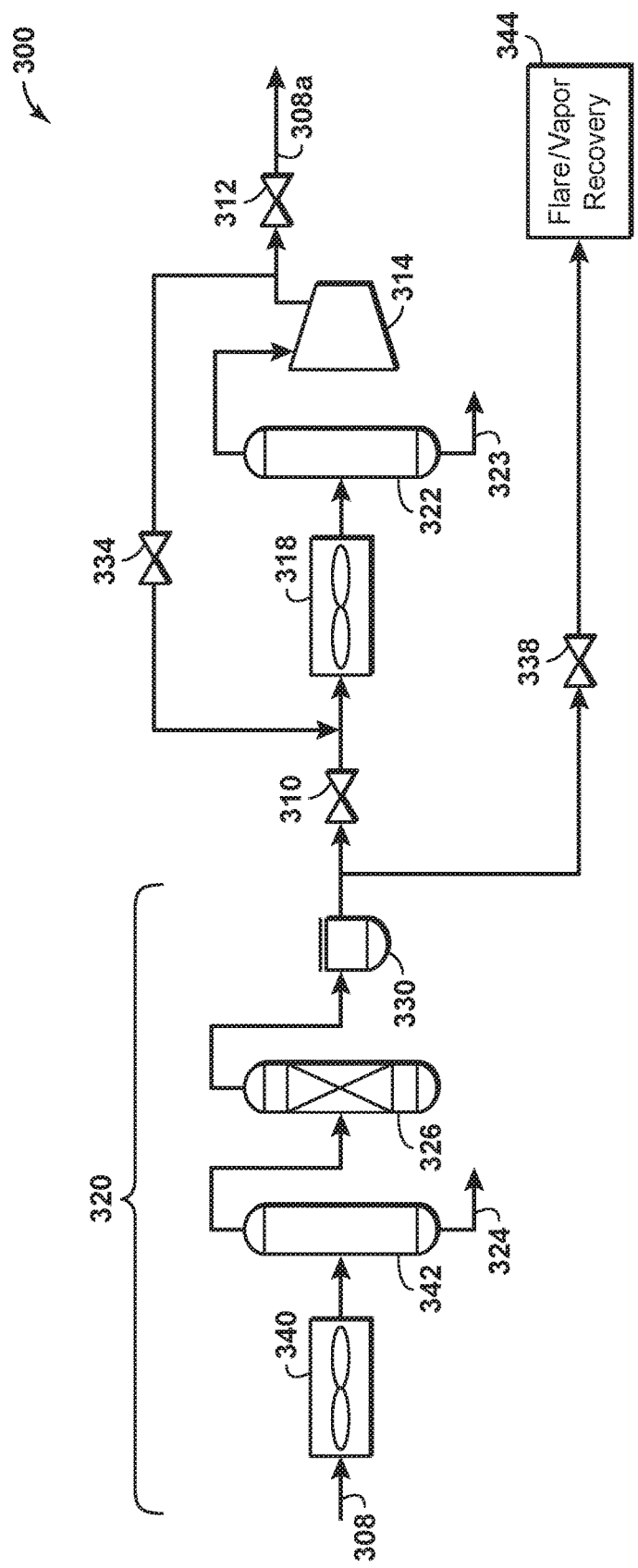
FIG. 3 is a schematic diagram of a regeneration gas treatment system according to the disclosed aspects.

FIG. 3 depicts a regeneration gas system 300 for water and mercury removal from a regeneration gas stream according to aspects of the disclosure. System 300 is similar to system 200, and similar components are identified by similar reference numbers herein. A regeneration gas stream 308, which includes contaminants removed from a molecular sieve adsorbent vessel (not shown), is first processed by gas processing components 320, which in the aspect shown in FIG. 3 include a first cooler 340, a first liquids separation drum 342, and a mercury removal unit 326. First cooler 340 is sized to cool the regeneration gas stream 308 to a temperature suitable for use in first liquids separation drum 342 and mercury removal unit 326. First cooler 340 may be an air cooler, a water cooler, or a refrigerant-based chiller such as a propane-based chiller. Additional coolers may be used as needed. First liquids separation drum 342 removes condensed liquids (via first liquids stream 324) from the regeneration gas stream after being cooled in the first cooler. In an aspect, first liquids stream may principally comprise water. Filters 330 may be required to prevent dust from mercury removal unit 326 traveling into equipment or valves downstream of the mercury removal unit. An additional filter/coalescer may be added upstream of mercury removal unit 326 if required.

A second cooler 318, a second liquids separation drum 322, and a compressor 314 are disposed between isolation valves 310, 312. Second cooler 318 may be sized to reduce the temperature of the regeneration gas stream during normal operation to the required operating temperature, or to remove heat generated during full recycle operation of compressor 314, whichever duty is largest. Second liquids separation drum 322 may be used to remove condensed liquids (via liquids stream 323) from the regeneration gas stream at the process conditions. Compressor 314 may be used during normal regeneration processes to recycle the processed regeneration gas stream 308a upstream of the molecular sieve adsorbent vessel (not shown).

When the compressor is operational, the isolation valves 310, 312 are open. Regeneration gas stream 308 flows through the gas processing components 320, second cooler 318, second liquids separation drum 322, and compressor 314, and is thereby cleaned and compressed sufficiently enough to recycled upstream of the molecular sieve adsorbent vessel. When compressor 314 is not operational, isolation valves 310, 312 are closed; regeneration gas stream 308 flows through the gas processing components 320 (which in FIG. 3 include first cooler 340, first liquids separation drum 342, mercury removal unit 326, and filter 330) and through a regeneration gas control valve 338 to a flare system or to an alternate vapor recovery system 344. This allows the gas processing components 320 of the regeneration gas system 300 to operate while compressor 314 is not in operation. Additionally, compressor 314 may be operated in a full recycle mode using an anti-surge valve 334, which connects part of the output of the compressor to an input of the second cooler. Using the anti-surge valve in this manner, the compressor may be re-started without interrupting flow of the regeneration gas stream 308. Such an operation permits continued mercury removal and/or liquids recovery from the regeneration gas stream, in contrast to existing technology that would send mercury to the flare, creating undesirable emissions.

Figure 4:
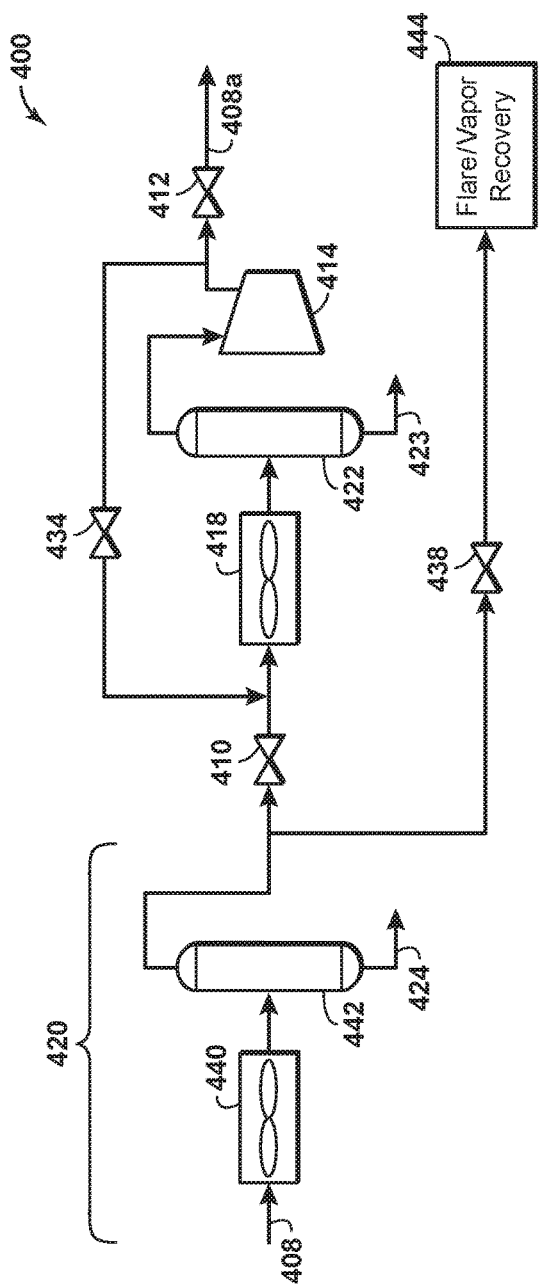
FIG. 4 is a schematic diagram of a regeneration gas treatment system according to the disclosed aspects.

FIG. 4 shows a regeneration gas system 400 for heavy hydrocarbon liquids recovery according to aspects of the disclosure. System 400 is similar to systems 200 and 300, and similar components are identified by similar reference numbers herein. A regeneration gas stream 408, which contains contaminants such as heavy hydrocarbons removed from a molecular sieve adsorbent vessel (not shown), is first processed by gas processing components 420, which in FIG. 4 include a first cooler 440 and a hydrocarbon liquids separation drum 442. The first cooler 440, which like cooler 240 may comprise one or more air coolers, water cooler, or refrigerant-based chillers, may be sized to cool the regeneration gas stream 408 to a temperature suitable for heavy hydrocarbon liquids knockout and recovery. The hydrocarbon liquids separation drum 442 removes condensed hydrocarbon product (via first hydrocarbon liquids stream 424) from the regeneration gas stream at the process conditions. In an aspect, first cooler 440 provide sufficient duty to condense all liquids in regeneration gas stream 408, and hydrocarbon liquids separation drum 442 then separates all such liquids as previously described, including any water present in the regeneration gas stream.

A second cooler 418, a liquids separation drum 422, and a compressor 414 are disposed between isolation valves 410, 412. Second cooler 418 may be sized to reduce the temperature of the regeneration gas stream 408 during normal operation to the required operating temperature, or to remove heat during full recycle operation of the compressor, whichever duty is largest. If the first cooler 440 is a refrigerant based chiller, then during normal operation the second cooler may chill the regeneration gas stream 408 to its lowest temperature, and second cooler 418 is only needed during full recycle operation of compressor 414. Liquids separation drum 422 is used to remove condensed liquids (via liquids stream 423) from the regeneration gas stream at the process conditions. Compressor 414 may be used during normal operation to recycle the processed regeneration gas stream 408a upstream of the molecular sieve adsorption vessel (not shown).

When the compressor is operational, isolation valves 410, 412 are open. Regeneration gas stream 408 flows through the gas processing components 420, second cooler 418, liquids separation drum 422, and compressor 414, and is thereby cleaned and compressed sufficiently to be recycled upstream of the molecular sieve adsorbent vessel as previously described. When the compressor 414 is not operational, the isolation valves 410, 412 are closed. Regeneration gas stream 408 flows through first cooler 440 and hydrocarbon liquids separation drum 442, and then through the regeneration gas control valve 438 to a flare system or to an alternate vapor recovery system 444. This allows the gas processing components 420 of the regeneration gas system to operate while the compressor 414 is not in operation. Additionally, compressor 414 may be operated in a full recycle mode using the anti-surge valve 434, which connects part of the output of the compressor to an input of the second cooler. Using the anti-surge valve in this manner, the compressor may be re-started without interrupting flow of the regeneration gas stream. Such an operation permits continued recovery of liquid heavy hydrocarbon from the regeneration gas that may otherwise be destroyed in the flare or be unrecoverable in an alternate vapor recovery system.

If first cooler 440 provides sufficient cooling duty—for example, if first cooler is a propane-based chiller—then most if not all of the liquids in the regeneration gas stream will be separated by hydrocarbon liquids separation drum 442. In that case it may be possible to significantly reduce the size of second cooler 418, as the purpose of the second cooler would be reduced to removing heat from the regeneration gas stream added by compressor 414. In an additional aspect, liquids separation drum 422 could be eliminated from the regeneration gas system 400, instead relying on first cooler 440 and hydrocarbon liquids separation drum 442 to remove heat and separate condensed liquids from the regeneration gas stream. Furthermore, the first liquids separation drum 242, 342 may be eliminated from the regeneration gas systems 200, 300 shown in FIGS. 2 and 3, by combining unit operations in a single process vessel 226, (or mercury removal unit 326) to remove contaminants and condensed liquids from the regeneration gas stream.

Figure 5:
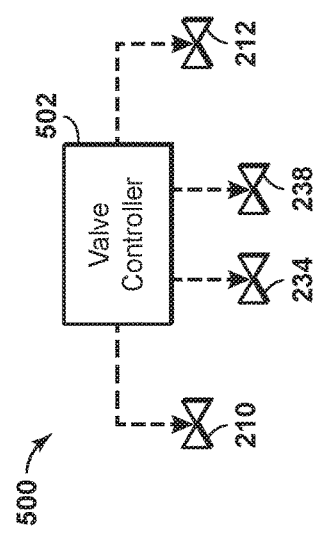
FIG. 5 is a schematic diagram of a valve control system according to disclosed aspects.

FIG. 5 is a schematic depiction of a valve control system 500 according to aspects of the disclosure, which may be used to actuate the valves in any of the disclosed aspects as shown in FIGS. 2-4. Valve control system 500 includes a valve controller 502 that is operationally connected to the isolation valves 210, 212, the anti-surge valve 234, and bypass valve 238. Valve controller 502 may be manually operated by an operator to selectively open and close these valves in response to process conditions and the disclosed methods of operation. Alternatively, the valve controller may selectively open and close these valves in response to signals from a computer, processor, and/or other automated equipment that uses pre-determined logic or algorithms to maintain and change operating states of the components of a gas processing facility in response to such process conditions and the disclosed methods of operation.

Figure 6:
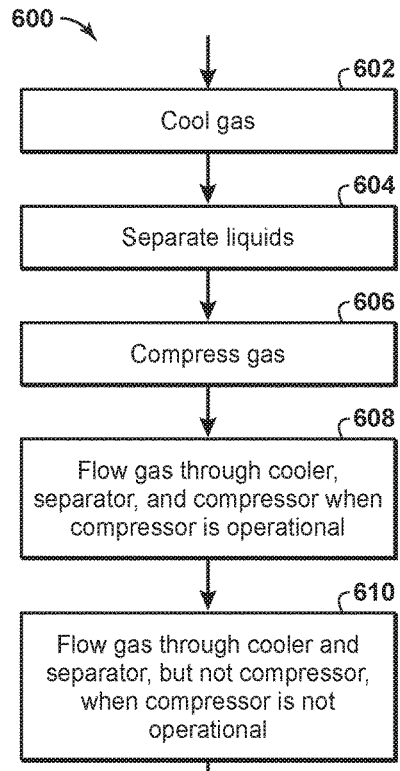
FIG. 6 is a method according to aspects of the present disclosure.

FIG. 6 is a flowchart of a method 600 for continuously treating a regeneration gas stream used to regenerate a molecular sieve adsorption vessel according to disclosed aspects. At block 602 the regeneration gas stream is cooled in a cooler to a temperature suitable to condense liquids in the regeneration gas stream. At block 604 a separator removes liquids condensed in the regeneration gas stream. At block 606 the regeneration gas stream is compressed in a compressor. At block 608 the regeneration gas stream is flowed through the cooler, the separator, and the compressor when the compressor is operational. At block 610 the regeneration gas stream is flowed through the second cooler and the second separator but not the compressor when the compressor is not operational.

Figure 7:
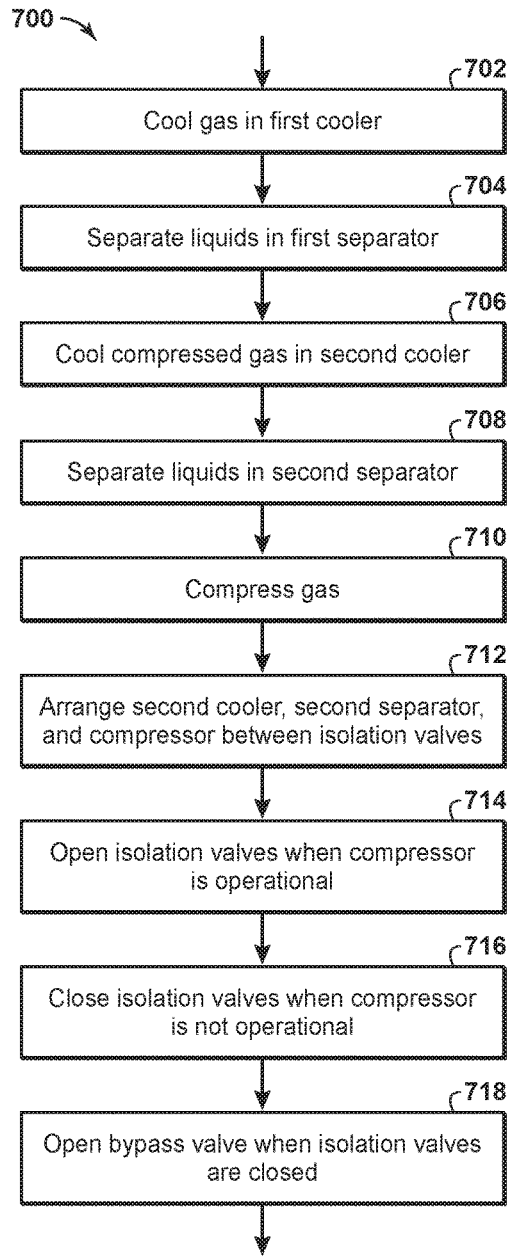
FIG. 7 is a method according to aspects of the present disclosure.

FIG. 7 is a flowchart of a method 700 for treating a regeneration gas stream used to regenerate a molecular sieve adsorption vessel according to disclosed aspects. At block 702 the regeneration gas stream is cooled in a first cooler to a temperature suitable to condense liquids in the regeneration gas stream. At block 704 a separator removes liquids condensed in the regeneration gas stream. At block 706 the regeneration gas stream is cooled in a second cooler to perform at least one of (a) removing any remaining heat in the regeneration gas stream to bring the regeneration gas stream down to a desired process temperature, and (b) removing heat of compression added to the regeneration gas stream by a compressor when the compressor is operating in a recycle mode, wherein the second cooler is sized to accommodate the larger of a heat duty required for (a) or a heat duty required for (b). At block 708 a second separator removes liquids condensed in the second cooler. At block 710 the regeneration gas stream is compressed in the compressor. At block 712 the compressor, the second cooler, and the second separator are arranged between first and second isolation valves. At block 714 the first and second isolation valves are opened when the compressor is operational, to permit the regeneration gas stream to flow to the second cooler, the second separator, and the compressor. At block 716 the first and second isolation valves are closed when the compressor is not operational, to prevent the regeneration gas stream to flow to the second cooler, the second separator, and the compressor. At block 718 a bypass valve is opened, to permit the regeneration gas stream to be flared or flowed to a vapor recovery system when the first and second isolation valves are closed.

Disclosed aspects may include any combinations of the methods and systems shown in the following numbered paragraphs. This is not to be considered a complete listing of all possible aspects, as any number of variations can be envisioned from the description above.

1. A method for continuously treating a regeneration gas stream used to regenerate a molecular sieve adsorption vessel, comprising:
cooling the regeneration gas stream in a cooler to a temperature suitable to condense liquids in the regeneration gas stream;
in a separator, removing liquids condensed in the regeneration gas stream;
compressing the regeneration gas stream in a compressor;
flowing the regeneration gas stream through the cooler, the separator, and the compressor when the compressor is operational; and
flowing the regeneration gas stream through the cooler and the separator but not the compressor when the compressor is not operational, thereby enabling continuous treatment of the regeneration gas stream.

2. The method of paragraph 1, wherein the cooler is a first cooler and the separator is a second separator, and further comprising:
cooling the regeneration gas stream in a second cooler to remove at least part of the heat added to the regeneration gas stream when the regeneration gas stream is compressed by the compressor;
in a second separator, removing liquids condensed in the second cooler;
arranging the second cooler, the second separator, and the compressor between first and second isolation valves;
opening the first and second isolation valves when the compressor is operational, to permit the regeneration gas stream to flow to the second cooler, the second separator, and the compressor; and
closing the first and second isolation valves when the compressor is not operational, to prevent the regeneration gas stream to flow to the second cooler, the second separator, and the compressor.

3. The method of paragraph 1, further comprising:
permitting the regeneration gas stream to bypass the second cooler, the second separator, and the compressor after passing through the first cooler and the first separator, thereby enabling continuous treatment of the regeneration gas stream.

4. The method of paragraph 2 or paragraph 3, further comprising:
flaring the regeneration gas stream when the regeneration gas stream is permitted to bypass the second cooler, the second separator, and the compressor.

5. The method of paragraph 2 or paragraph 3, further comprising:
recovering vapor from the regeneration gas stream when the regeneration gas stream is permitted to bypass the second cooler, the second separator, and the compressor, thereby enabling continuous treatment of the regeneration gas stream.

6. The method of paragraph 1, further comprising:
removing contaminants from the regeneration gas stream in a process vessel that is located so that the regeneration gas stream flows therethrough when the compressor is operational and when the compressor is not operational.

7. The method of paragraph 6, wherein the process vessel removes mercury from the regeneration gas stream.

8. The method of paragraph 2, further comprising:
separating heavy hydrocarbons liquids from the regeneration gas stream in the first separator.

9. The method of paragraph 8, further comprising:
cooling the regeneration gas stream in the first cooler to a temperature at which heavy hydrocarbons condense.

10. A contaminant removal system for continuously treating a regeneration gas stream of a molecular sieve adsorbent vessel, comprising:
a cooler configured to cool the regeneration gas stream;
a separator configured to remove liquids in the regeneration gas stream condensed by the cooler;
a compressor that compresses the regeneration gas stream after liquids have been removed therefrom by the separator;
first and second isolation valves located before and after the compressor and configured to selectively permit the regeneration gas stream to pass therethrough, wherein the cooler and the separator are not located between the first and second isolation valves; and
a controller that controls the isolation valves to open when the compressor is operational and to close when the compressor is not operational;
wherein the regeneration gas stream flows through the cooler and the separator regardless of whether the isolation valves are open or closed, thereby enabling continuous treatment of the regeneration gas stream.

11. The containment removal system of paragraph 10, wherein the cooler is a first cooler and the separator is a first separator, and further comprising:
a second cooler configured to cool the regeneration gas stream;
a second separator configured to remove liquids condensed by the second cooler;
wherein the second cooler and second separator are disposed between the first and second isolation valves such that the regeneration gas stream flows through the first cooler, the first separator, the first isolation valve, the second cooler, the second separator, the compressor, and the second isolation valve when the first and second isolation valves are open.

12. The contaminant removal system of paragraph 10, further comprising a bypass valve configured to permit the regeneration gas stream to bypass the second cooler, the second separator, and the compressor after passing through the first cooler and the first separator, when the first and second isolation valves are closed, thereby enabling continuous treatment of the regeneration gas stream.

13. The contaminant removal system of paragraph 12, further comprising a flare system configured to flare the regeneration gas stream flowing through the bypass valve.

14. The contaminant removal system of paragraph 12, further comprising a vapor recovery system configured to recover vapor from the regeneration gas stream flowing through the bypass valve.

15. The contaminant removal system of paragraph 10, further comprising a process vessel configured to remove contaminants from the regeneration gas stream, wherein the process vessel is located so that the regeneration gas stream flows therethrough when the compressor is operational and when the compressor is not operational.

16. The contaminant removal system of paragraph 15, wherein the process vessel comprises a mercury removal vessel.

17. The contaminant removal system of paragraph 10, wherein the separator comprises a knockout drum configured to separate heavy hydrocarbons liquids from the regeneration gas stream.

18. The contaminant removal system of paragraph 17, wherein the cooler is configured to cool the regeneration gas stream to a temperature at which heavy hydrocarbons condense.

19. A method for continuously treating a regeneration gas stream used to regenerate a molecular sieve adsorption vessel, comprising:
cooling the regeneration gas stream in a first cooler to a temperature suitable to condense liquids in the regeneration gas stream;
in a separator, removing liquids condensed in the regeneration gas stream;
cooling the regeneration gas stream in a second cooler to perform at least one of:
(a) removing any remaining heat in the regeneration gas stream to bring the regeneration gas stream down to a desired process temperature, and
(b) removing heat of compression added to the regeneration gas stream by a compressor when the compressor is operating in a recycle mode,
wherein the second cooler is sized to accommodate the larger of a heat duty required for (a) or a heat duty required for (b);
in a second separator, removing liquids condensed in the second cooler;
compressing the regeneration gas stream in the compressor;
arranging the second cooler, the second separator, and the compressor between first and second isolation valves;
opening the first and second isolation valves when the compressor is operational, to permit the regeneration gas stream to flow to the second cooler, the second separator, and the compressor;
closing the first and second isolation valves when the compressor is not operational, to prevent the regeneration gas stream to flow to the second cooler, the second separator, and the compressor; and
opening a bypass valve to permit the regeneration gas stream to be flared or flowed to a vapor recovery system when the first and second isolation valves are closed, thereby enabling continuous treatment of the regeneration gas stream.

20. The method of paragraph 19, further comprising:
removing contaminants from the regeneration gas stream in a process vessel that is located so that the regeneration gas stream flows therethrough when the compressor is operational and when the compressor is not operational.

It should be understood that the numerous changes, modifications, and alternatives to the preceding disclosure can be made without departing from the scope of the disclosure. The preceding description, therefore, is not meant to limit the scope of the disclosure. Rather, the scope of the disclosure is to be determined only by the appended claims and their equivalents. It is also contemplated that structures and features in the present examples can be altered, rearranged, substituted, deleted, duplicated, combined, or added to each other.

What is claimed is:

1. A method for continuously treating a regeneration gas stream used to regenerate a molecular sieve adsorption vessel, comprising:
cooling the regeneration gas stream in a cooler to a temperature suitable to condense liquids in the regeneration gas stream;
in a separator, removing liquids condensed in the regeneration gas stream;
compressing the regeneration gas stream in a compressor;
flowing the regeneration gas stream through the cooler, the separator, and the compressor when the compressor is operational; and
flowing the regeneration gas stream through the cooler and the separator but not the compressor when the compressor is not operational, thereby enabling continuous treatment of the regeneration gas stream.

2. The method of claim 1, wherein the cooler is a first cooler and the separator is a first separator, and further comprising:
cooling the regeneration gas stream in a second cooler to remove at least part of the heat added to the regeneration gas stream when the regeneration gas stream is compressed by the compressor;
in a second separator, removing liquids condensed in the second cooler;
arranging the second cooler, the second separator, and the compressor between first and second isolation valves;
opening the first and second isolation valves when the compressor is operational, to permit the regeneration gas stream to flow to the second cooler, the second separator, and the compressor; and
closing the first and second isolation valves when the compressor is not operational, to prevent the regeneration gas stream from flowing to the second cooler, the second separator, and the compressor.

3. The method of claim 2, further comprising:
permitting the regeneration gas stream to bypass the second cooler, the second separator, and the compressor after passing through the first cooler and the first separator, thereby enabling continuous treatment of the regeneration gas stream.

4. The method of claim 2, further comprising:
flaring the regeneration gas stream when the regeneration gas stream is permitted to bypass the second cooler, the second separator, and the compressor.

5. The method of claim 2, further comprising:
recovering vapor from the regeneration gas stream when the regeneration gas stream is permitted to bypass the second cooler, the second separator, and the compressor, thereby enabling continuous treatment of the regeneration gas stream.

6. The method of claim 1, further comprising:
removing contaminants from the regeneration gas stream in a process vessel that is located so that the regeneration gas stream flows therethrough when the compressor is operational and when the compressor is not operational.

7. The method of claim 6, wherein the process vessel removes mercury from the regeneration gas stream.

8. The method of claim 2, further comprising:
separating heavy hydrocarbon liquids from the regeneration gas stream in the first separator.

9. The method of claim 8, further comprising:
cooling the regeneration gas stream in the first cooler to a temperature at which heavy hydrocarbons condense.

10. A method for continuously treating a regeneration gas stream used to regenerate a molecular sieve adsorption vessel, comprising:
- cooling the regeneration gas stream in a first cooler to a temperature suitable to condense liquids in the regeneration gas stream;
- in a separator, removing liquids condensed in the regeneration gas stream;
- cooling the regeneration gas stream in a second cooler to perform at least one of
  - (a) removing any remaining heat in the regeneration gas stream to bring the regeneration gas stream down to a desired process temperature, and
  - (b) removing heat of compression added to the regeneration gas stream by a compressor when the compressor is operating in a recycle mode,
  - wherein the second cooler is sized to accommodate the larger of a heat duty required for (a) or a heat duty required for (b);
- in a second separator, removing liquids condensed in the second cooler;
- compressing the regeneration gas stream in the compressor;
- arranging the second cooler, the second separator, and the compressor between first and second isolation valves;
- opening the first and second isolation valves when the compressor is operational, to permit the regeneration gas stream to flow to the second cooler, the second separator, and the compressor;
- closing the first and second isolation valves when the compressor is not operational, to prevent the regeneration gas stream from flowing to the second cooler, the second separator, and the compressor; and
- opening a bypass valve to permit the regeneration gas stream to be flared or flowed to a vapor recovery system when the first and second isolation valves are closed, thereby enabling continuous treatment of the regeneration gas stream.

11. The method of claim 10, further comprising:
removing contaminants from the regeneration gas stream in a process vessel that is located so that the regeneration gas stream flows therethrough when the compressor is operational and when the compressor is not operational.

* * * * *